United States Patent Office 3,020,320
Patented Feb. 6, 1962

3,020,320
PREPARATION OF LONG-CHAIN PRIMARY ALIPHATIC ALCOHOLS
Charles Paquot, Daniel Lefort, and Janine Sorba, all of Paris, France, assignors to Centre National de la Recherche Scientifique, Paris, France, a corporation of France
No Drawing. Filed Dec. 18, 1958, Ser. No. 781,213
Claims priority, application France Dec. 24, 1957
7 Claims. (Cl. 260—638)

The conversion of aliphatic acids to primary alcohols which have the same number of carbon atoms, by hydrogenation of the acid function is a well-known reaction which is applied in industrial fields.

Two methods are employed concurrently: hydrogenation by sodium and alcohol (Bouveault and Blanc reaction) and catalytic hydrogenation of the copper chromite type; these two reactions are generally carried out on an ester, and not on the free acid itself.

Since the natural aliphatic acids which are present in fatty substances, whether of animal or of vegetable origin, are acids which have an even number of carbon atoms, the alcohols obtained in conformity with these methods are fatty alcohols having an even number of carbon atoms.

It will be clear that considerable advantages may be gained by using the same raw materials to obtain fatty alcohols having an odd number of carbon atoms, either by adding or by removing a carbon atom. In this respect, inventors have been prompted to determine the conditions of stability of saturated aliphatic peracids, and have thus been led to a new process for the conversion of a fatty acid to an alcohol having one carbon atom less.

It is known that, starting from fatty acids, it is possible to prepare the corresponding peracids by the action of highly concentrated hydrogen peroxide under well-determined conditions. These peracids are relatively stable at low temperatures, but if they are heated to a temperature higher than that which corresponds to the melting point, they decompose very abruptly.

During the course of tests carried out by the inventors in connection with the conditions of decomposition of these peracids, the following observations have been made:

(1) Under well-determined conditions, and especially in the presence of suitable solvents, the reaction of decomposition of peracids is made progressive and controllable, even if it is carried out at the boiling temperature of the solvent. It is always preferable to operate at the boiling point of the solvent, and it is helpful to produce a steady boil by mechanical agitation or by the presence of a porous substance.

(2) The nature of the solvent used is of great importance in making the reaction decomposition of the peracid to primary alcohol and carbon dioxide preponderant, as shown in the results which have been summarized in Table I below, with reference to the decomposition of 10% solutions of perlauric acid in various organic solvents, by heating to the boiling temperature of each of the solvents employed.

TABLE I

| Solvent | Efficiency in undecanol, percent | Time required to decompose 95% of perlauric acid |
|---|---|---|
| Carbon tetrachloride | 1 | 5 to 30 hours. |
| Chloroform | 1 | 12 to 30 hours. |
| Acetone | 24 | 30 hours. |
| Ethyl-oxide | 15–20 | 40 to 50 hours. |
| Benzene | 55 | ½ to 6 hours. |
| Petroleum ether (B.P. 95–120° C.) | 60–70 | 10 to 30 minutes. |
| Petroleum ether (B.P. 65–70° C.) | 75–90 | 30 to 100 minutes. |
| Dioxane | 85 | 1 to 3 hours. |
| Cyclohexane | 85 | 15 minutes. |

(3) The concentration of peracid in the solvent may vary between fairly wide limits (for example from 1 to 25%) without substantially affecting the final result.

(4) The mechanism of the reaction of decomposition may be oriented as required by making use of various compounds, preferably reducing agents. On the other hand, the presence of hydrogen peroxide remaining in the peracid inhibits the reaction of decomposition which it is desired to obtain.

The present invention is the outcome of these observations, and has for its object, in a general way, a new method starting with an aliphatic peracid having $n$ atoms of carbon and permitting of the preparation at a high efficiency of both the corresponding primary alcohol having $n-1$ atoms of carbon, and especially the primary aliphatic alcohols corresponding to the following peracids: percapric, perlauric, permyristic, perpalmitic and perstearic.

This method consists essentially in carrying out the decomposition of the peracid in the presence of a suitable solvent and, when so required, by adding certain other substances with the object of increasing the speed of reaction, the decomposition being effected by heating the solvent to boiling point with constant agitation, for the length of time required.

The additional compounds are subsequently eliminated from the reaction medium by filtration, and the solvent is then eliminated by evaporation in order to isolate the primary alcohol which is afterwards purified in accordance with known methods.

The solvent employed may be petroleum ether, dioxane, cyclohexane, either alone or mixed together.

Use may also be made of an additional compound enabling the reaction to be orientated as required, e.g. ferrous sulphate. Such a compound acts as an accelerator, increasing the speed of reaction.

The decomposition reaction proper is advantageously carried out by starting from solutions of the peracid in the solvent having concentrations which may vary between 1 and 25%, and especially solutions with a content of approximately 10%.

In accordance with this method, and in the case in which petroleum ether or dioxane or cyclohexane is employed as a solvent, the preponderant reaction of decomposition of the peracid is as follows:

$$R\text{—}CH_2\text{—}CO_3H \rightarrow R\text{—}CH_2OH + CO_2$$

In these formulae, R represents a saturated aliphatic hydrocarbon chain which can contain from 8 to 18 atoms of carbon and especially the hydrocarbon chains corresponding to capric, lauric, myristic, palmitic and stearic acids.

It should be observed that as the alcohol outputs are not quantitative, small quantities of acid corresponding to the peracid are formed during the course of the reaction as well as saturated hydrocarbons with $n-1$ and $2n-2$ atoms of carbon, where $n$ is the number of carbon atoms of the initial peracid.

Since the perlauric, permyristic and perpalmitic acids produce identical reactions of decomposition, several examples will be described below in which the invention is carried into effect for the case of perlauric acid with various solvents (Examples I to III) and for percapric, permyristic, perpalmitic and perstearic acids in Examples IV to VII.

*Example I*

10 grams of perlauric acid of 99.9% purity having a peroxide index equal to 74,000 (expressed in micrograms of oxygen per gram of product) are placed in a balloon flask over which is mounted a reflux cooler, and mixed with 100 ml. of petroleum ether boiling at 65 to 72° C. and previously washed with sulphuric acid and distilled. The mixture is brought quickly up to boiling point and kept under agitation so as to obtain a rapid dissolving of the peracid. After boiling for one hour, the peroxide index is practically zero and the reaction of decomposition is completely finished. The solvent is then evaporated and leaves a liquid residue of 8.5 grams.

The analysis of this residue shows that it contains 80% of n-undecanol and 15% of lauric acid.

This residue is washed with an aqueous solution of approximately normal soda in order to eliminate the lauric acid, then starting from the new remainder, the n-undecanol is separated in its pure state by fractional distillation, the n-undecane distilling over in the first fraction, while the n-docosane does not distil. These two hydrocarbons together represent a total of 4% of the initial mixture.

*Example II*

Operating exactly in the same conditions as in Example I, but using as a solvent petroleum ether boiling at between 95 and 120°, the reaction is quicker and is almost complete after 5 minutes' boiling; the final product however only contains 60% of n-undecanol.

*Example III*

Operating under exactly the same conditions as for Example I, but using crude perlauric acid of 90% purity, and with cyclohexane as a solvent, the reaction is completed in 15 minutes and the final product contains 11% of lauric acid and 85% of n-undecanol with respect to the perlauric acid which was initially present.

These examples show in particular that the efficiency in primary alcohol may reach 85% without thereby being affected by the presence in the initial peracid of small quantities of acid, and that in addition to this, practically the entire quantity of solvent used in the reaction is recovered.

*Example IV*

Operating exactly as for Example I, and starting with 10 grams of percapric acid at 99.5% purity, the peroxide index being equal to 84,500, and using 100 ml. of petroleum ether with a boiling temperature between 65 and 72° C. as a solvent, by boiling for one hour and then evaporating the solvent, a residue of 8.2 grams is obtained, containing 81% of n-nonanol and 15% of capric acid.

The efficiency in n-nonanol starting with percapric acid is equal to 81%.

*Example V*

Operating exactly as described in Example I, and starting with 10 grams of permyristic acid at 98.5% purity with a peroxide index equal to 64,400, and using 100 ml. of petroleum ether with a boiling temperature of 65 to 72° C. as a solvent, then by boiling for one hour and evaporating the solvent, a residue of 8.5 grams is obtained containing 80% of n-tridecanol and 18% of myristic acid.

The efficiency in n-tridecanol starting from permyristic acid is equal to 82%.

*Example VI*

Operating exactly as for Example I, and starting with 10 grams of perpalmitic acid at 97% purity and a peroxide index equal to 57,000 and using 100 ml. of petroleum ether with a boiling temperature of 65 to 72° C. as a solvent, then by boiling for one hour and evaporating the solvent, a residue of 8.7 grams is obtained containing 78% of n-pentadecanol and 19% of palmitic acid.

The efficiency in n-pentadecanol starting from perpalmitic acid is equal to 80%.

*Example VII*

Operating exactly as in Example I, and starting with 10 grams of perstearic acid at 95% purity and a peroxide index equal to 50,500, and using 100 ml. of petroleum ether with a boiling temperature of 65 to 72° C. as a solvent, then by boiling for one hour and then evaporating the solvent, a residue of 8.7 grams is obtained containing 75% of a n-heptadecanol and 22% of stearic acid.

The efficiency in n-heptadecanol starting from perstearic acid is equal to 77%.

*Example VIII*

Operating under exactly the same conditions as in Example I, and starting with 10 grams of perlauric acid of 99.9% purity and of peroxide index equal to 74,000, and using 100 ml. dioxane (boiling point 102° C.) as a solvent, by boiling for one hour and then evaporating the solvent, a residue of 8.6 grams is obtained, containing 85% of n-undecanol and 11% of lauric acid.

What we claim is:

1. A method of preparation of primary alcohols having $n-1$ atoms of carbon, starting from the corresponding saturated straight chain aliphatic peracid having $n$ atoms of carbon, the peracid having the formula R—$CH_2$—$CO_3H$ where R represents a saturated hydrocarbon chain containing from 8 to 18 atoms of carbon, comprising the steps of mixing said peracid with a solvent chosen from the group consisting of petroleum ether, dioxane, cyclohexane and mixtures thereof, and heating said peracid and solvent mixture to boiling temperature with continuous agitation for a period of time comprised between 5 and 180 minutes.

2. A method as claimed in claim 1, in which the peracid is chosen from the group consisting of percapric, perlauric, permyristic, perpalmitic and perstearic peracids.

3. A method as claimed in claim 1, further comprising the step of adding ferrous sulphate thereby increasing the speed of reaction.

4. A method as claimed in claim 1, in which the said solvent is removed from the mixture by evaporation.

5. A method as claimed in claim 1, in which the solvent employed is petroleum ether.

6. A method as claimed in claim 1 in which the solvent employed is dioxane.

7. A method as claimed in claim 1 in which the solvent employed is cyclohexane.

References Cited in the file of this patent

Parker et al.: J. Am. Chem. Soc., vol. 77, pp. 4037–41 (1955).